US009600818B2

(12) United States Patent
Sadacharam et al.

(10) Patent No.: US 9,600,818 B2
(45) Date of Patent: *Mar. 21, 2017

(54) SECURE IDENTITY AUTHENTICATION IN AN ELECTRONIC TRANSACTION

(71) Applicant: INTERNATIONAL BUSINESS MACHINES CORPORATION, Armonk, NY (US)

(72) Inventors: Saravanan Sadacharam, Chennai (IN); Ram Viswanathan, Plano, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/210,262

(22) Filed: Jul. 14, 2016

(65) Prior Publication Data

US 2016/0321672 A1   Nov. 3, 2016

Related U.S. Application Data

(63) Continuation of application No. 14/597,827, filed on Jan. 15, 2015, now Pat. No. 9,413,757.

(51) Int. Cl.
*G06F 7/04* (2006.01)
*G06Q 20/40* (2012.01)
*G06Q 20/32* (2012.01)

(52) U.S. Cl.
CPC ... *G06Q 20/40145* (2013.01); *G06Q 20/3223* (2013.01); *G06Q 20/3276* (2013.01); *H04L 2463/121* (2013.01)

(58) Field of Classification Search
CPC ........... G06Q 20/3274; G06Q 20/3223; G06Q 20/3276; G06Q 20/40145; H04L 2463/121;

(Continued)

(56) References Cited

U.S. PATENT DOCUMENTS 8,654,971 B2   2/2014 Orsini et al.
2006/0098241 A1   5/2006 Cheong et al.
(Continued)

FOREIGN PATENT DOCUMENTS

WO   2014055279   4/2014

OTHER PUBLICATIONS

Advanced Online Security; retrieved from the Internet Aug. 20, 2014, URL http://www.unitedelpaso.com/advanced-online-security.aspx; 3 pages.
Choudhary, Sourabh Kumar et al.; QR Code Based Secure OTP Distribution Scheme for Authentication in Net-Banking; International Journal of Information Science and Intelligent System, vol. 2, No. 4, 2013; Oct. 31, 2013; pp. 115-121.
Gandhi, Abhishek et al.; Advanced Online Banking Authentication System Using One Time Passwords Embedded in Q-R Code; International Journal of Computer Science and Information Technologies, vol. 5, Issue 2; Mar.-Apr. 2014; pp. 1327-1329.
(Continued)

*Primary Examiner* — Brian Shaw
(74) *Attorney, Agent, or Firm* — Schmeiser, Olsen & Watts; John Pivnichny

(57) ABSTRACT

An approach is provided for securely authenticating an identity of a user participating in an electronic transaction. A request for a biometric identifier/security question is converted to a first Quick Response (QR) code. Based on user attributes and a request from the user's mobile device to a computer to initiate the transaction, the first QR code is disassembled into first and second portions. The first portion, but not the second portion, is sent to the mobile device. Responsive to the mobile device reassembling the first QR code, receiving and converting the biometric identifier/answer to the security question to a second QR code, disassembling the second QR code into first and second portions, and transmitting the first portion of the second QR code to the computer, the second QR code is reassembled. The transaction is authorized based on whether the biometric identifier/answer matches a data repository record.

15 Claims, 5 Drawing Sheets

(58) Field of Classification Search
CPC ............ H04L 2209/80; H04L 63/0853; H04L 63/0861; H04L 9/3271
USPC ........................................................ 726/3–5
See application file for complete search history.

(56) References Cited

U.S. PATENT DOCUMENTS

| | | |
|---|---|---|
| 2008/0072304 A1 | 3/2008 | Jennings et al. |
| 2011/0218427 A1 | 9/2011 | Kitamura |
| 2012/0233669 A1 | 9/2012 | Husemann et al. |
| 2012/0240204 A1 | 9/2012 | Bhatnagar et al. |
| 2013/0019096 A1 | 1/2013 | Palzer et al. |
| 2013/0054271 A1 | 2/2013 | Langford et al. |
| 2013/0124855 A1 | 5/2013 | Varadarajan et al. |
| 2013/0262309 A1 | 10/2013 | Gadotti |
| 2014/0032345 A1 | 1/2014 | Moore |
| 2014/0081784 A1 | 3/2014 | Ahn |

OTHER PUBLICATIONS

Potoczny-Jones, Isaac; Quick authentication using mobile devices and QR Codes; retrieved from the Internet Aug. 20, 2014 URL: http://corp.galois.com/blog/2011/1/5/quick-authentication-using-mobile-devices-and-qr-codes.html; Jan. 5, 2011; 9 pages.

Sarma, Mukund; Second Level Authentication Using QR Codes; International Journal of Computer and Internet Security; vol. 5, No. 2; Nov. 2013; pp. 43-50.

Tokenless authentication just got easier with one time QR codes; retrieved from the Internet Aug. 20, 2014, URL https://securenvoy.com/blog/2014/02/07/tokenless-authentication-just-got-easier-with-one-time-qr-codes; post Feb. 7, 2014; 9 pages.

Two Factor Authentication: More Secure Banking for You; Retrieved from the Internet Aug. 20, 2014, URL http://www.e-gulfbank.com/eng/personal/dnBanking/247Banking/2fa.jsp; 4 pages.

Notice of Allowance (Mailing Date May 4, 2016) for U.S. Appl. No. 14/597,827, filed Jan. 15, 2015; Confirmation No. 6467.

US 9,600,818 B2

SECURE IDENTITY AUTHENTICATION IN AN ELECTRONIC TRANSACTION

This application is a continuation application claiming priority to Ser. No. 14/597,827 filed Jan. 15, 2015.

TECHNICAL FIELD

The present invention relates to managing an electronic transaction, and more particularly to securely authenticating an identity of a party to an electronic transaction.

BACKGROUND

With the advent of mobile device-based payments and new online fraud patterns, authentication of an identity of a user participating in an electronic transaction over the Internet has become more challenging. Forms of identity authentication include security questions and biometric identifiers (e.g., fingerprints). The security of identify authentication is vulnerable because attackers capture and log wireless network traffic that includes transmissions of security questions, answers to security questions, biometric identifiers and requests for particular biometric identifiers. After being unlawfully captured or captured without permission from the parties to the transaction, information needed to authenticate an identity is used to perform fraudulent transactions.

BRIEF SUMMARY

In a first embodiment, the present invention provides a method of securely authenticating an identity of a user participating in an electronic transaction with an enterprise. The method includes a computer receiving a request from a mobile device of the user to initiate the electronic transaction and receiving information that specifies attributes of the user and the request. The method further includes the computer selecting a request for a biometric identifier or a security question to authenticate the identity of the user. The method further includes the computer converting the selected request for the biometric identifier or the security question to a first complete Quick Response (QR) code. The method further includes based on the information that specifies the attributes of the user and the request, the computer disassembling the first complete QR code into first and second portions of the first complete QR code. The first portion of the first complete QR code is selected by a QR code disassembly algorithm. The first and second portions of the first complete QR code do not have an element in common. The method further includes the computer sending to the mobile device the first portion of the first complete QR code, but not the second portion of the first complete QR code, which prevents an entity other than the user and the enterprise from obtaining the request for the biometric identifier or the security question by capturing network traffic that includes the electronic transaction.

In a first aspect of the present invention, the method further includes in response to a scan of the first portion of the first complete QR code by the mobile device, a reassembly of the first complete QR code by the mobile device which employs the first portion of the first complete QR code and a QR code assembly algorithm, a display by the mobile device of the request for the biometric identifier or the security question, a receipt by the mobile device of the biometric identifier or an answer to the security question, a conversion of the biometric identifier or the answer to the security question to a second complete QR code, a disassembly of the second complete QR code into first and second portions of the second complete QR code by employing the QR code disassembly algorithm, and a transmission of the first portion of the second complete QR code from the mobile device to the computer, the computer reassembling the second complete QR code by employing the QR code assembly algorithm and the first portion of the second complete QR code, which prevents the entity other than the user and the enterprise from obtaining the biometric identifier or the answer to the security question by capturing the network traffic that includes the electronic transaction.

In a second aspect of the present invention, the method further includes the computer extracting the biometric identifier or the answer to the security question from the second complete QR code. The method further includes the computer determining whether the extracted biometric identifier or the answer to the security question matches a record in a data repository that includes biometric identifiers or answers to security questions. The method further includes if the extracted biometric identifier or the extracted answer to the security question matches the record in the data repository, the computer authorizing the electronic transaction or if the extracted biometric identifier or the extracted answer to the security question does not match any record in the data repository, the computer indicating the electronic transaction is not authorized.

In a third aspect of the present invention, the reassembly of the first complete QR code by the mobile device is performed in response to the mobile device generating a plurality of initial potential QR codes of a plurality of requests for biometric identifiers or a plurality of security questions. The reassembly of the first complete QR code by the mobile device is performed further in response to the mobile device deleting portions of the respective initial potential QR codes by employing the QR code disassembly algorithm and the information that specifies the attributes of the user and the request, where each of the deleted portions matches a shape of the first portion of the first complete QR code. The reassembly of the first complete QR code by the mobile device is performed further in response to the mobile device generating new potential QR codes by filling in the deleted portions with the first portion of the first complete QR code. The reassembly of the first complete QR code by the mobile device is performed further in response to the mobile device determining that one of the new potential QR codes matches one of the initial potential QR codes in the plurality of initial potential QR codes. The reassembly of the first complete QR code by the mobile device is performed further in response to, based on the one new potential QR code matching one of the initial potential QR codes, the mobile device determining the one new potential QR code is the reassembly of the first complete QR code.

In a fourth aspect of the present invention, the step of reassembling the second complete QR code by employing the QR code assembly algorithm and the first portion of the second complete QR code includes the computer generating a plurality of initial potential QR codes of a plurality of biometric identifiers or a plurality of answers to the security questions. The step of reassembling the second complete QR code by employing the QR code assembly algorithm and the first portion of the second complete QR code further includes the computer deleting portions of the respective initial potential QR codes by employing the QR code disassembly algorithm and information that specifies the attributes of the user and the transmission of the first portion of the second complete QR code, where each of the deleted portions matches a shape of the first portion of the second complete QR code. The step of reassembling the second complete QR code by employing the QR code assembly algorithm and the first portion of the second complete QR code further includes the computer generating new potential QR codes by filling in the deleted portions with the first portion of the second complete QR code; the computer determining that one of the new potential QR codes matches one of the initial potential QR codes in the plurality of initial potential QR codes. The step of reassembling the second complete QR code by employing the QR code assembly algorithm and the first portion of the second complete QR code further includes based on the one new potential QR code matching one of the initial potential QR codes, the mobile device determining the one new potential QR code is a reassembly of the second complete QR code.

In a fifth aspect of the present invention, the step of receiving the information that specifies the attributes of the user and the request includes the computer completing a handshake with the mobile device and recording a timestamp of the handshake, where the information that specifies the attributes of the request includes the timestamp, and where the step of disassembling the first complete QR code into the first and second portions of the first complete QR code includes selecting the first portion of the first complete QR code based at least in part on the recorded timestamp.

In a sixth aspect of the present invention, the method further includes prior to any transaction between the user and the enterprise, the computer storing a plurality of security questions, receiving from the user and storing a plurality of biometric identifiers of the user or a plurality of answers to the security questions, and generating and storing a plurality of requests for the biometric identifiers. The method further includes subsequent to the step of receiving the request to initiate the electronic transaction, the computer determining the electronic transaction is a banking transaction for an amount of money that exceeds a threshold amount. The method further includes based on the banking transaction being for an amount of money exceeding the threshold amount, the computer utilizing a random number generator which randomly selects the request for the biometric identifier from the plurality of requests for the biometric identifiers or the security question from the plurality of security questions.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of securely authenticating an identity of a user participating in an electronic transaction with an enterprise. The method includes the computer system receiving a request from a mobile device of the user to initiate the electronic transaction and receiving information that specifies attributes of the user and the request. The method further includes the computer system selecting a request for a biometric identifier or a security question to authenticate the identity of the user. The method further includes the computer system converting the selected request for the biometric identifier or the security question to a first complete Quick Response (QR) code. The method further includes based on the information that specifies the attributes of the user and the request, the computer system disassembling the first complete QR code into first and second portions of the first complete QR code. The first portion of the first complete QR code is selected by a QR code disassembly algorithm. The first and second portions of the first complete QR code do not have an element in common. The method further includes the computer system sending to the mobile device the first portion of the first complete QR code, but not the second portion of the first complete QR code, which prevents an entity other than the user and the enterprise from obtaining the request for the biometric identifier or the security question by capturing network traffic that includes the electronic transaction.

In a third embodiment, the present invention provides a method of securely authenticating an identity of a user participating in an electronic transaction with an enterprise. The method includes a mobile device of the user sending a request to a server computer of the enterprise to initiate the electronic transaction. The method further includes the mobile device receiving information that specifies attributes of the user and the request to initiate the electronic transaction. The method further includes in response to a selection of a request for a biometric identifier or a security question to authenticate the identity of the user, a conversion of the selected request for the biometric identifier or the security question to a first complete Quick Response (QR) code, a disassembly of the first complete QR code into first and second portions of the first complete QR code by a QR code disassembly algorithm based on the information that specifies the attributes of the user and the request to initiate the electronic transaction, where the first and second portions of the first complete QR code do not have an element in common, the mobile device receiving from the server computer the first portion of the first complete QR code, but not the second portion of the first complete QR code, which prevents an entity other than the user and the enterprise from obtaining the request for the biometric identifier or the security question by capturing network traffic that includes the electronic transaction.

Embodiments and aspects of the present invention summarized above provide enhanced security for authentication whenever establishing the identity of a person is critical, such as conducting high value financial transactions, making life altering decisions, managing war heads, etc. Transmission of a portion of a QR code that specifies biographic information or biometric identifiers facilitates prevention of a malicious entity from intercepting the transmission of authentication requests to a mobile device or computer or the transmission of authentication data from a mobile device or computer during an electronic transaction. Embodiments of the present invention can coexist with existing biographic based authentication.

DETAILED DESCRIPTION

Overview

Embodiments of the present invention sends a portion of a complete QR code during an electronic transaction between a first computer (e.g., mobile device) and a second computer, where the QR code specifies authentication information which authenticates the identity of a user of the first computer. By sending only a portion of the complete QR code, rather than the complete QR code, embodiments of the present invention prevent a malicious entity from (1) intercepting the authentication information or (2) intercepting the complete QR code and deriving the authentication information from the intercepted complete QR code, and subsequently using the authentication information for a fraudulent transaction.

System for Secure Authentication of an Identity in an Electronic Transaction

Figure 1:
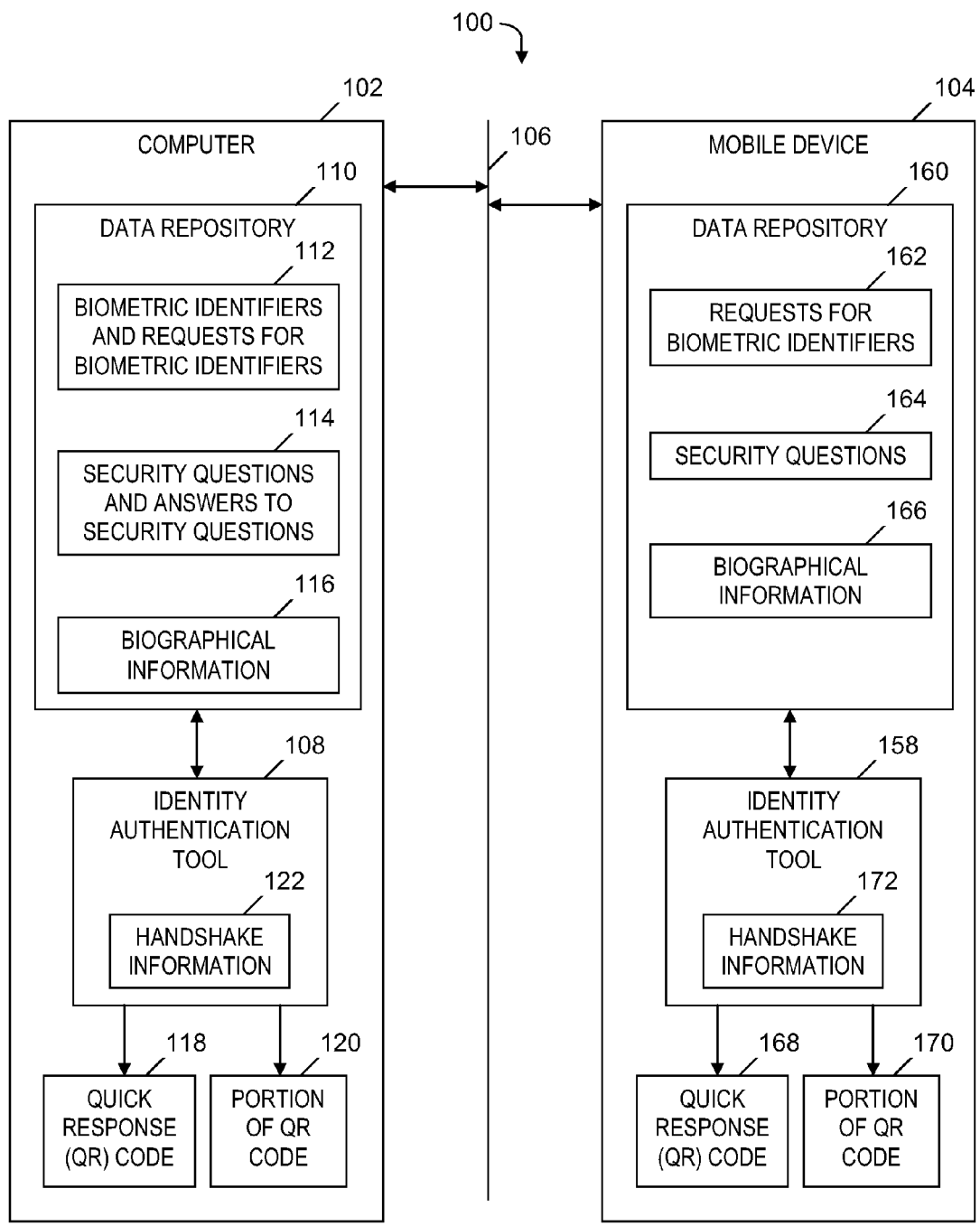
FIG. 1 is a block diagram of a system for securely authenticating an identity of a user participating in an electronic transaction with an enterprise, in accordance with embodiments of the present invention.

FIG. 1 is a block diagram of a system 100 for securely authenticating an identity of a user participating in an electronic transaction with an enterprise, in accordance with embodiments of the present invention. System 100 includes a computer 102 and a mobile device 104, between which data for electronic transactions is transmitted via a computer network 106. Computer 102 executes a software-based identity authentication tool 108, which accesses a data repository 110 that includes biometric identifiers and requests for biometric identifiers 112, security questions and answers to security questions 114, and biographical information 116 about a user of mobile device 104 and other users of computers and mobile devices that participate in electronic transactions with computer 102. Biometric identifiers 112 include, for example, one or more fingerprints of the user of mobile device 104. Security questions 114 are authenticators used by enterprises such as banks, cable companies and wireless providers to provide an extra layer of security, and include, for example, a question that asks a user the make and model of the user's first car. Biographical information 116 includes, for example, a user's date of birth or social security number.

Identity authentication tool 108 generates a QR code 118 that specifies one of the requests for biometric identifiers 112 or one of the security questions 114. Identity authentication tool 108 generates a portion 120 of QR code 118 by applying a disassembly algorithm (not shown) to disassemble QR code 118 into a first portion that is to be transmitted to mobile device 104 and a second portion that is not transmitted to mobile device 104. The disassembly into the first and second portions is based on at least biographical information 116 and handshake information 122. Handshake information 122 includes a timestamp of a time at which a handshake occurred between computer 102 and mobile device 104, where the handshake is required to initiate a transmission of data between computer 102 and mobile device 104 as part of an electronic transaction between a user utilizing mobile device 104 and an enterprise or another user utilizing computer 102, and where the data is needed for a query for an identity authentication.

Identity authentication tool 108 receives a portion of another QR code that specifies a biometric identifier that is a response to one of the requests for biometric identifiers 112 or an answer to a security question that is a response to one of the security questions 114. The received portion is described below in the discussion of a portion of a QR code generated by mobile device 104.

Mobile device 104 executes a software-based identity authentication tool 158, which accesses a data repository 160 that includes requests for biometric identifiers 162, security questions 164, and biographical information 166 about a user of mobile device 104, who is participating in an electronic transaction with an enterprise or other user that utilizes computer 102. The requests for biometric identifiers 162 are included in the requests for the biometric identifiers 112 stored in data repository 110. Security questions 164 are the one or more security questions corresponding to the user of mobile device 104 (i.e., selected by the user or for the user by the enterprise that utilizes computer 102), which are included in security questions 114 stored in data repository 110. The requests for biometric identifiers 162 and security questions 164 are encrypted by a cryptographic hash function (e.g., the MD5 algorithm). Biographical information 166 is the biographical information corresponding to the user of mobile device 104, which is included in biographical information 116 and includes, for example, the date of birth or social security number of the user of mobile device 104.

Identity authentication tool 158 receives handshake information 122 and portion 120 of QR code 118 and applies an assembly algorithm (not shown) to reassemble QR code 118 from portion 120 by utilizing biographical information 166 and handshake information 122, which includes the timestamp of the handshake between computer 102 and mobile device 104 for the transmission of portion 120 from computer 102 to mobile device 104. From the reassembled QR code 118, identity authentication tool 158 determines the request for biometric identifier included in requests for biometric identifiers 162 or the security question included in security questions 164.

Identity authentication tool 158 generates a QR code 168 that specifies (1) one of the biometric identifiers 112 which is a user-provided response to one of the requests for biometric identifiers 162, or (2) one of the answers to security questions 114, which is a user-provided response to one of the security questions 164. Identity authentication tool 158 generates a portion 170 of QR code 168 by applying the aforementioned disassembly algorithm (not shown) to disassemble QR code 168 based on at least biographical information 166 and handshake information 172. Handshake information 172 includes a timestamp of a time at which a handshake occurred between computer 102 and mobile device 104, where the handshake is required to initiate a transmission of data between computer 102 and mobile device 104 as part of an electronic transaction between a user utilizing mobile device 104 and an enterprise or another user utilizing computer 102, and where the data is an authenticator (e.g., fingerprint or answer to a security question) provided by a user as a response to a query for an identity authentication.

Identity authentication tool 158 sends portion 170 of QR code 168. Identity authentication tool 108 receives handshake information 172, receives portion 170, and applies an assembly algorithm (not shown) to reassemble QR code 168 from portion 170 by utilizing biographical information 116 and handshake information 172, which includes the timestamp of the handshake between computer 102 and mobile device 104 for the transmission of portion 170 from mobile device 104 to computer 102. From the reassembled QR code 168, identity authentication tool 108 determines the biometric identifier included in biometric identifiers 112 or the answer to the security question included in answers to security questions 114.

In one embodiment, one or more computers (not shown) other than mobile device 104 are in communication with computer 102 via network 106. Each of the one or more computers includes the components that are included in mobile device 104.

In an alternative embodiment, system 100 includes a second computer in communication with computer 102 via network 106, where the second computer is not a mobile device and replaces mobile device 104 in FIG. 1, and where the second computer includes the components shown in FIG. 1 which are included in mobile device 104.

In one embodiment, mobile device 104 is coupled to a device (not shown) that reads or scans a biometric identifier of the user of mobile device 104. For example, mobile device 104 is coupled to a fingerprint reader.

The functionality of the components of FIG. 1 is described in more detail in the discussions presented below relative to FIGS. 2A-2C and FIG. 3.

Process for Secure Authentication of an Identity in an Electronic Transaction

Figure 2A:
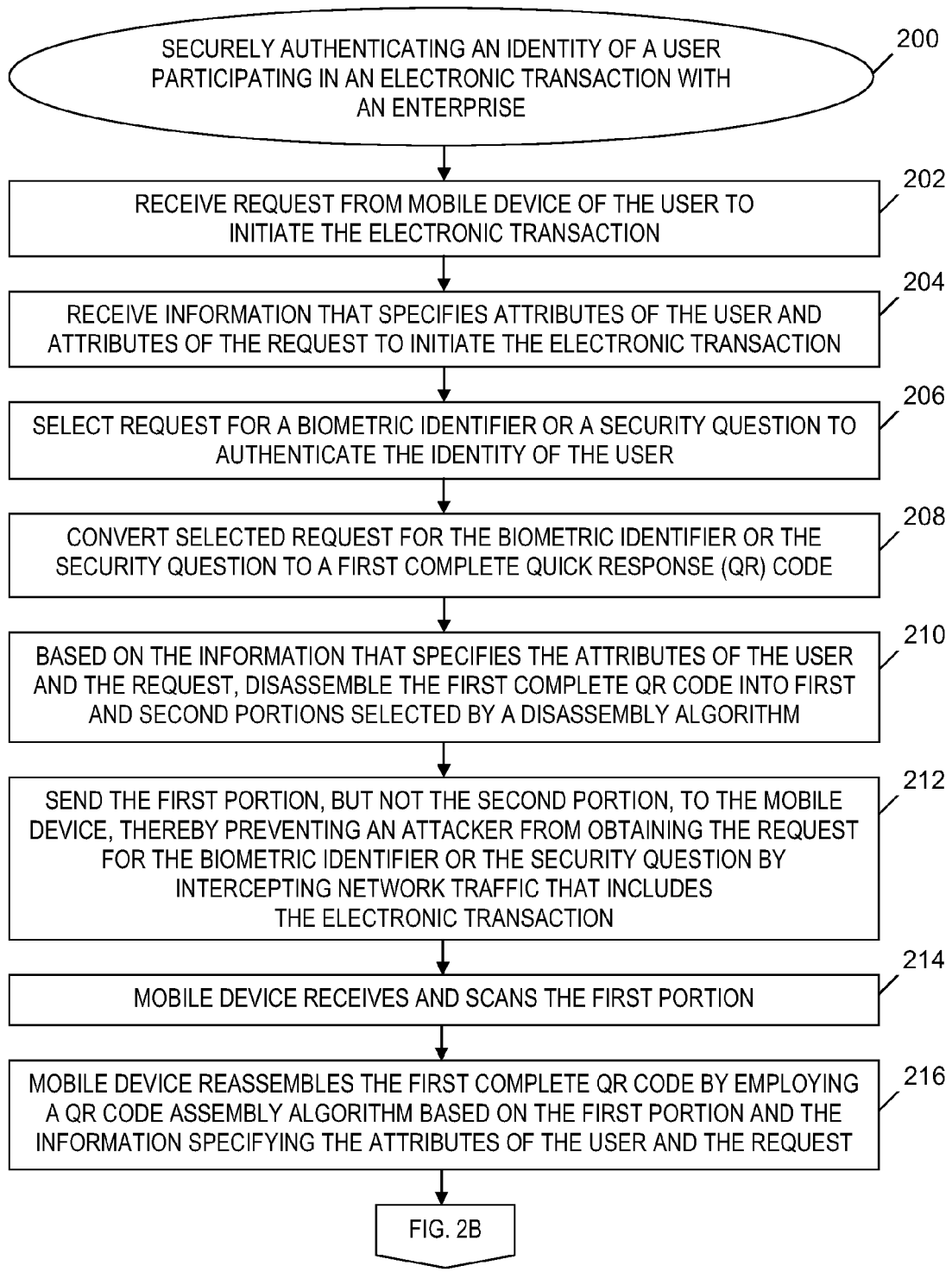
FIGS. 2A-2C depict a flowchart of a process of securely authenticating an identity of a user participating in an electronic transaction with an enterprise, where the process is implemented in the system of FIG. 1, in accordance with embodiments of the present invention.
Figure 2B:
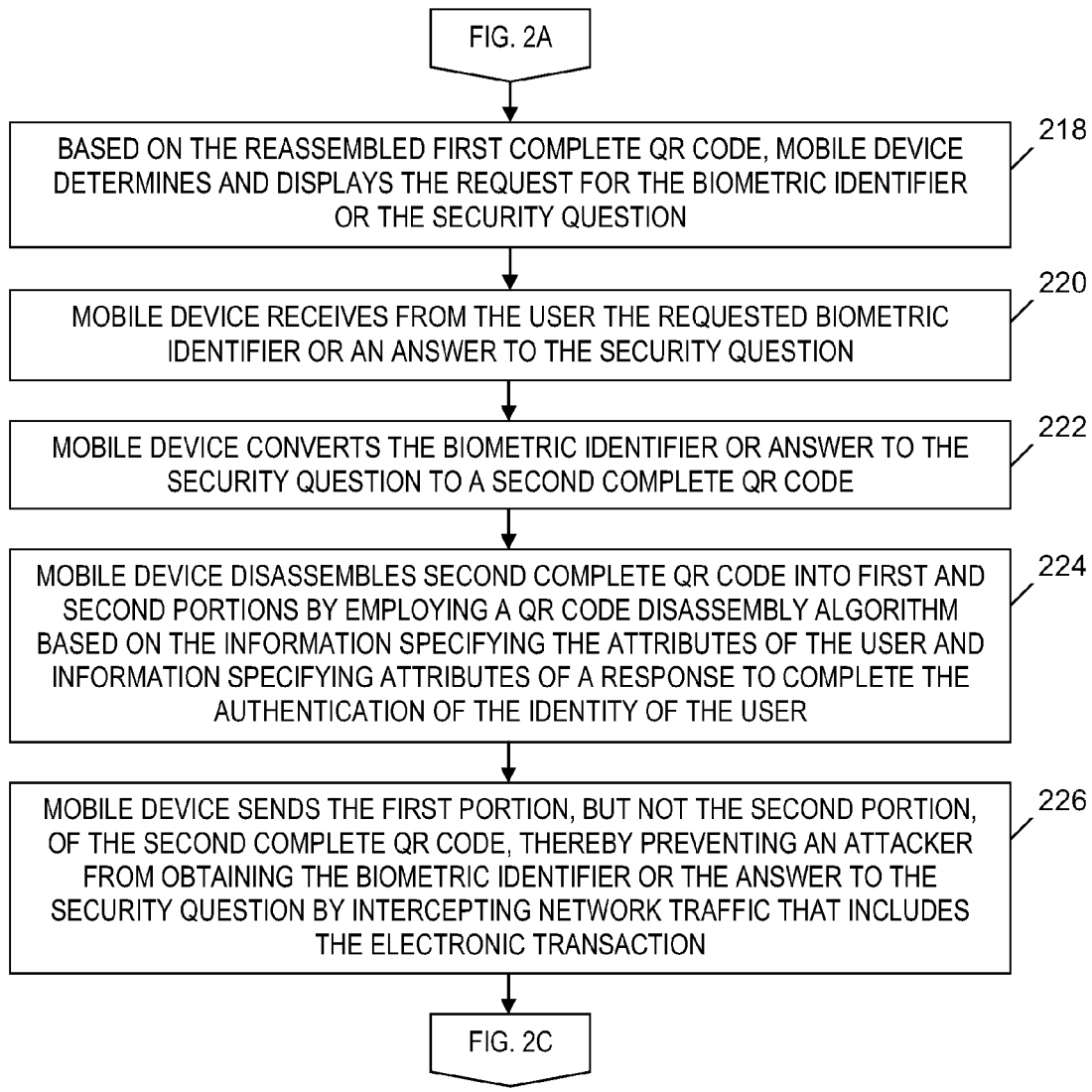
Figure 2C:
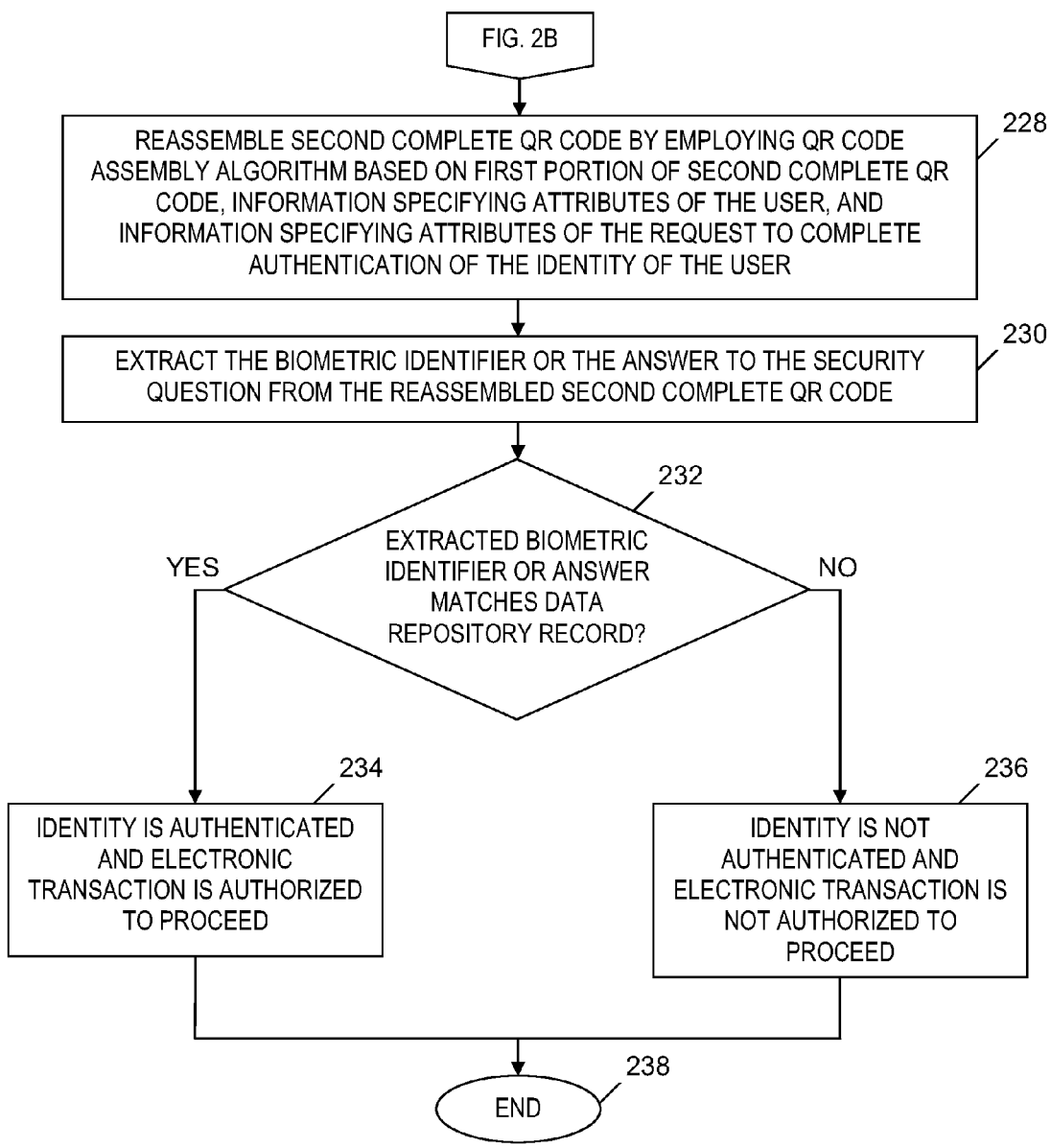

FIGS. 2A-2C depict a flowchart of a process of authenticating an identity of a user participating in an electronic transaction with an enterprise, where the process is implemented in the system of FIG. 1, in accordance with embodiments of the present invention. The process of FIGS. 2A-2C begins at step 200 in FIG. 2A. In step 202, identity authentication tool 108 (see FIG. 1) receives a request from the mobile device 104 (see FIG. 1) of a user to initiate an electronic transaction between computer 102 (see FIG. 1) and mobile device 104 (see FIG. 1).

In step 204, identity authentication tool 108 (see FIG. 1) and identity authentication tool 158 (see FIG. 1) receive handshake information 122 which specifies attributes of the request to initiate the electronic transaction, including a timestamp of a handshake between computer 102 (see FIG. 1) and mobile device 104 (see FIG. 1), which is required to initiate and authenticate the electronic transaction. In step 204, identity authentication tool 108 (see FIG. 1) also receives attributes of the user, including biographical information of the user. Identity authentication tool 108 (see FIG. 1) retrieves the biographical information of the user from biographical information 116 (see FIG. 1).

In one embodiment, subsequent to step 202 and prior to step 206, identity authentication tool 108 (see FIG. 1) determines the requested electronic transaction is a financial transaction for a monetary amount that exceeds a threshold amount that was received by identity authentication tool 108 (see FIG. 1) prior to step 202. Based on the financial transaction being for a monetary amount that exceeds the threshold amount, identity authentication tool 108 (see FIG. 1) performs step 206, which is described below.

In step 206, identity authentication tool 108 (see FIG. 1) selects an authenticator to authenticate the identity of the user in order to authorize the electronic transaction. The authenticator is a request for a biometric identifier selected from requests for biometric identifiers 112 (see FIG. 1) or a security question selected from security questions 114 (see FIG. 1). In one embodiment, identity authentication tool 108 (see FIG. 1) utilizes a random number generator to randomly select the authenticator.

In step 208, identity authentication tool 108 (see FIG. 1) converts the authenticator selected in step 206 to a first complete QR code (i.e., QR code 118 (see FIG. 1)). Identity authentication tool 108 (see FIG. 1) stores the first complete QR code in association with an identifier of the electronic transaction in data repository 110 (see FIG. 1).

In step 210, based on information that specifies attributes of the request received in step 202, which includes handshake information 122 (see FIG. 1), and based on information that specifies attributes of the user (i.e., biographical information of the user included in biographical information 116 (see FIG. 1)), identity authentication tool 108 (see FIG. 1) disassembles the first complete QR code into a first portion (i.e., portion 120 (see FIG. 1)) selected and designated by a disassembly algorithm and into a second portion, where the first and second portions do not have any elements in common. The first portion is, for example, a defined shape included within the complete QR code. The second portion includes all parts of the complete QR code that were not selected by the disassembly algorithm as the first portion (i.e., the part of the complete QR code that was not designated as the first portion). The disassembly algorithm selects the first portion based at least in part on the timestamp of the handshake between computer 102 (see FIG. 1) and mobile device 104 (see FIG. 1) included in handshake information 122 (see FIG. 1).

In step 212, identity authentication tool 108 (see FIG. 1) sends the first portion of the first complete QR code, but not the second portion or any part of the second portion, to mobile device 104 (see FIG. 1). By sending only the first portion, system 100 (see FIG. 1) prevents an attacker or other malicious entity from obtaining the request for the biometric identifier or the security question selected in step 206 by intercepting and/or capturing data traffic of network 106, where the traffic includes transmissions of data for the electronic transaction between computer 102 (see FIG. 1) and mobile device 104 (see FIG. 1). The aforementioned attacker or other malicious entity is an entity other than the user utilizing mobile device 104 (see FIG. 1) and the enterprise or other user utilizing computer 102 (see FIG. 1), and is an entity who does not have permission to intercept the data traffic that includes the electronic transaction.

In step 214, mobile device 104 (see FIG. 1) receives and scans the first portion of the first complete QR code.

In step 216, based on information that specifies attributes of the request received in step 202, which includes handshake information 122 (see FIG. 1), and based on information that specifies attributes of the user (i.e., biographical information of the user included in biographical information 166 (see FIG. 1)), identity authentication tool 158 (see FIG. 1) reassembles the first complete QR code from the first portion (i.e., portion 120 (see FIG. 1)) by employing an assembly algorithm.

In one embodiment, identity authentication tool 158 (see FIG. 1) employing the assembly algorithm (1) generates multiple initial potential QR codes that specify requests for biometric identifiers 162 (see FIG. 1) or security questions 164 (see FIG. 1); (2) deletes portions of the respective initial potential QR codes by employing the disassembly algorithm and the information that specifies the attributes of the user and the request received in step 202, where each of the deleted portions matches a shape of the first portion of the first complete QR code; (3) generates new potential QR codes by filling in the deleted portions with the first portion of the first complete QR code; (4) determines that one of the new potential QR codes matches one of the initial potential QR codes; and (5) based on the one new potential QR code matching one of the initial potential QR codes, determines the one new potential QR code is a reassembly of the first complete QR code.

In another embodiment, QR codes of the requests for biometric identifiers 162 and security questions 164 are stored in data repository 160. Identity authentication tool 158 (see FIG. 1) employing the assembly algorithm (1) retrieves from data repository 160 multiple potential QR codes that specify requests for biometric identifiers 162 (see FIG. 1) or security questions 164 (see FIG. 1); (2) obtains portions of the respective potential QR codes by employing the disassembly algorithm and the information received in step 204 that specifies the attributes of the user and the request received in step 202, where each of the obtained portions matches a shape of the first portion of the first complete QR code; (3) attempts to match the first portion to the obtained portions until a match is identified; and (4) in response to identifying a match, identify the potential QR code that included the obtained portion that matches the first portion and designate the identified potential QR code as the reassembly of the first complete QR code.

In step 218 in FIG. 2B, based on the first complete QR code reassembled in step 216 (see FIG. 2A), identity authentication tool 158 (see FIG. 1) determines and displays the request for the biometric identifier or the security question specified by the reassembled first complete QR code.

In step 220, identity authentication tool 158 (see FIG. 1) receives from the user the requested biometric identifier specified by the first complete QR code or an answer to the security question specified by the first complete QR code.

In step 222, identity authentication tool 158 (see FIG. 1) converts the biometric identifier or answer to the security question received in step 220 into a second complete QR code (i.e., QR code 168 (see FIG. 1)), which is different from the aforementioned first complete QR code.

Prior to step 224, identity authentication tool 158 (see FIG. 1) initiates a response to complete the authentication of the identity of the user, where the response is a user-provided answer to the authentication request that was determined in step 218. The initiation of the response to complete the authentication requires a handshake between mobile device 104 (see FIG. 1) and computer 102 (see FIG. 1), which is completed, with the resulting handshake information 172 (see FIG. 1) being received by identity authentication tool 158 (see FIG. 1) and identity authentication tool 108 (see FIG. 1). Handshake information 172 includes a timestamp of the handshake required to initiate the response to complete the authentication.

In step 224, information that specifies attributes of the response to complete the authentication of the identity of the user (i.e., handshake information 172, including the aforementioned timestamp of the handshake) and based on information that specifies attributes of the user (i.e., biographical information of the user retrieved from biographical information 166 (see FIG. 1)), identity authentication tool 158 (see FIG. 1) disassembles the second complete QR code into a first portion (i.e., portion 170 (see FIG. 1)) selected and designated by the disassembly algorithm and into a second portion, where the first and second portions do not have any elements in common. The first portion 170 (see FIG. 1) is, for example, a defined shape included within the second complete QR code. The second portion of the second complete QR code includes all parts of the second complete QR code that were not selected by the disassembly algorithm as the first portion (i.e., the part of the second complete QR code that was not designated as the first portion). The disassembly algorithm selects the first portion of the second complete QR code based at least in part on the timestamp of the aforementioned handshake between computer 102 (see FIG. 1) and mobile device 104 (see FIG. 1) included in handshake information 172 (see FIG. 1).

In step 226, identity authentication tool 158 (see FIG. 1) sends to computer 102 (see FIG. 1) the first portion of the second complete QR code as a response to the authentication request determined in step 218, but does not send the second portion or any part of the second portion of the second complete QR code. By sending only the first portion of the second complete QR code, system 100 (see FIG. 1) prevents an attacker or other malicious entity from obtaining the biometric identifier or the answer to the security question received in step 220 by intercepting and/or capturing data traffic of network 106, where the traffic includes transmissions of data for the electronic transaction between computer 102 (see FIG. 1) and mobile device 104 (see FIG. 1), and prevents a subsequent usage of the intercepted or captured biometric identifier or answer to the security question in a fraudulent transaction.

In step 228 in FIG. 2C, based on information that specifies attributes of the response sent in step 226 (see FIG. 2B), which includes the timestamp included in handshake information 172 (see FIG. 1), and based on information that specifies attributes of the user (i.e., biographical information of the user included in biographical information 116 (see FIG. 1)), identity authentication tool 108 (see FIG. 1) reassembles the second complete QR code from the first portion (i.e., portion 170 (see FIG. 1)) by employing the assembly algorithm.

In one embodiment, identity authentication tool 108 (see FIG. 1) employing the assembly algorithm (1) generates multiple initial potential QR codes that specify biometric identifiers 112 (see FIG. 1) or answers to security questions 114 (see FIG. 1); (2) deletes portions of the respective initial potential QR codes by employing the disassembly algorithm and the information that specifies the attributes of the user and the response send in step 226 (see FIG. 2B), where each of the deleted portions matches a shape of the first portion 170 (see FIG. 1) of the second complete QR code 168 (see FIG. 1); (3) generates new potential QR codes by filling in the deleted portions with the first portion 170 (see FIG. 1) of the second complete QR code 168 (see FIG. 1); (4) determines that one of the new potential QR codes matches one of the initial potential QR codes; and (5) based on the one new potential QR code matching one of the initial potential QR codes, determines the one new potential QR code is a reassembly of the second complete QR code.

In another embodiment, QR codes of the biometric identifiers 112 and answers to security questions 114 are stored in data repository 110. Identity authentication tool 108 (see FIG. 1) employing the assembly algorithm (1) retrieves from data repository 110 multiple potential QR codes that specify biometric identifiers 112 (see FIG. 1) or answers to security questions 114 (see FIG. 1); (2) obtains portions of the respective potential QR codes by employing the disassembly algorithm and the information that specifies the attributes of the user and the response sent in step 226 (see FIG. 2B), where each of the obtained portions matches a shape of the first portion of the second complete QR code; (3) attempts to match the first portion of the second complete QR code to the obtained portions until a match is identified; and (4) in response to identifying a match, identify the potential QR code that included the obtained portion that matches the first portion and designate the identified potential QR code as the reassembly of the second complete QR code.

In step 230, identity authentication tool 108 (see FIG. 1) extracts the biometric identifier or the answer to the security question from the second complete QR code reassembled in step 228.

In step 232, identity authentication tool 108 (see FIG. 1) determines whether the biometric identifier or answer to the security question extracted in step 230 matches a record in data repository 110 (see FIG. 1). If identity authentication tool 108 (see FIG. 1) determines in step 232 that the extracted biometric identifier or extracted answer matches a record in data repository 110 (see FIG. 1), then the Yes branch of step 232 is taken and step 234 is performed.

In step 234, identity authentication tool 108 (see FIG. 1) authenticates the identity of the user and mobile device 104 (see FIG. 1) receives an authorization from computer 102 (see FIG. 1) for the electronic transaction to proceed.

Returning to step 232, if identity authentication tool 108 (see FIG. 1) determines that the extracted biometric identifier or the extracted answer does not match any record in data repository 110 (see FIG. 1), then the No branch of step 232 is taken and step 236 is performed.

In step 236, identity authentication tool 108 (see FIG. 1) indicates that the identity of the user is not authenticated and mobile device 104 (see FIG. 1) receives from computer 102 (see FIG. 1) an indication that the electronic transaction is not authorized to proceed.

The process of FIGS. 2A-2C ends at step 238, which follows step 234 and step 236.

Computer System

Figure 3:
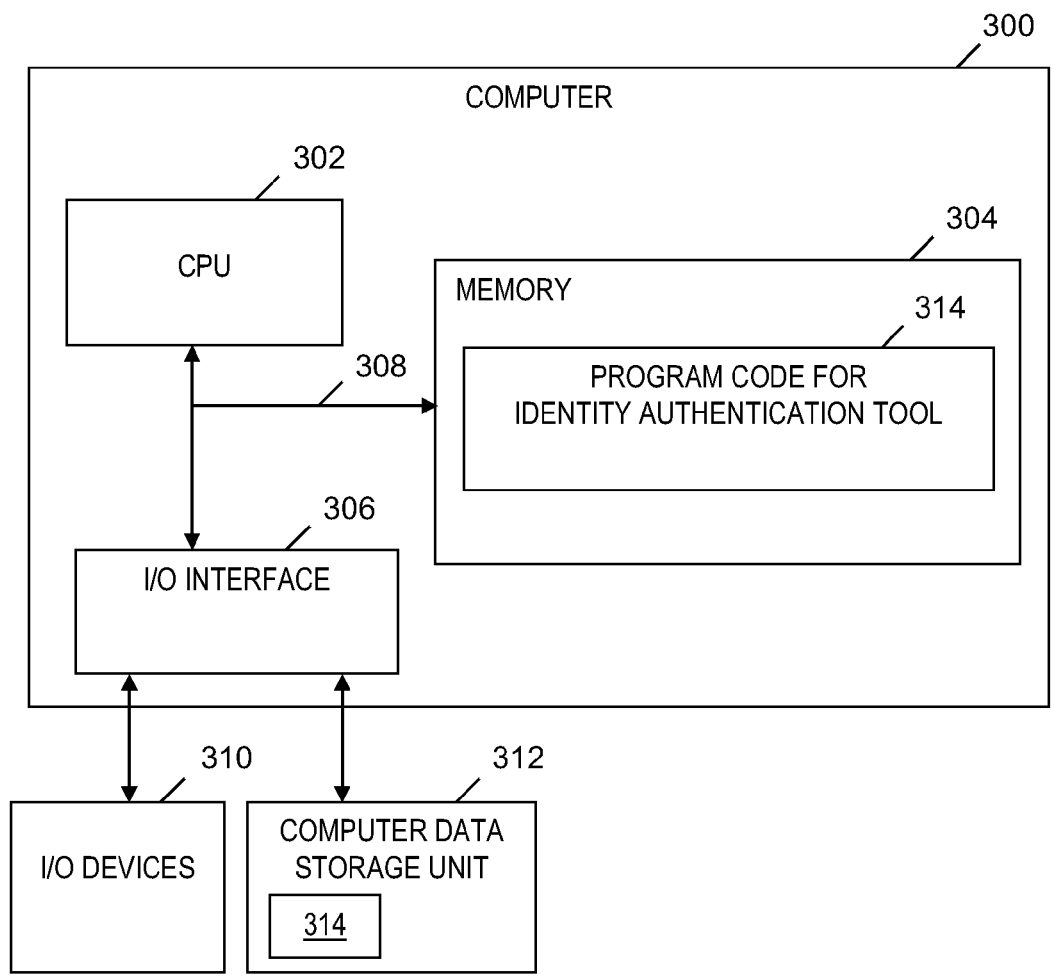
FIG. 3 is a block diagram of a computer or mobile device that is included in the system of FIG. 1 and that implements the process of FIGS. 2A-2C, in accordance with embodiments of the present invention.

FIG. 3 is a block diagram of a computer or mobile device that is included in the system of FIG. 1 and that implements the process of FIGS. 2A-2C, in accordance with embodiments of the present invention. Computer 300 is a computer system or mobile device that generally includes a central processing unit (CPU) 302, a memory 304, an input/output (I/O) interface 306, and a bus 308. Further, computer 300 is coupled to I/O devices 310 and a computer data storage unit 312. In one embodiment, computer 300 is computer 102 (see FIG. 1). In one embodiment, computer 300 is mobile device 104 (see FIG. 1). CPU 302 performs computation and control functions of computer 300, including carrying out instructions included in program code 314 to perform a method of securely authenticating an identity of a user participating in an electronic transaction, where the instructions are carried out by CPU 302 via memory 304. CPU 302 may include a single processing unit, or be distributed across one or more processing units in one or more locations (e.g., on a client and server). Program code 314 includes program code for the software-based components of computer 300, such as identity authentication tool 108 (see FIG. 1) or identity authentication tool 158 (see FIG. 1).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are carried out. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display device, keyboard, etc. Bus 308 provides a communication link between each of the components in computer 300, and may include any type of transmission link, including electrical, optical, wireless, etc.

I/O interface 306 also allows computer 300 to store information (e.g., data or program instructions such as program code 314) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are carried out by CPU 302 via memory 304 to securely authenticate an identity of a user participating in an electronic transaction. Although FIG. 3 depicts memory 304 as including program code 314, the present invention includes embodiments in which memory 304 does not include all of code 314 simultaneously, but instead at one time includes only a portion of code 314.

Further, memory 304 includes an operating system (not shown) and may include other systems not shown in FIG. 3.

Storage unit 312 and/or one or more other computer data storage units (not shown) that are coupled to computer 300 may include data repository 110 (see FIG. 1) or data repository 160 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to securely authenticating an identity of a user participating in an electronic transaction. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 300) including one or more processors (e.g., CPU 302), wherein the processor(s) carry out instructions contained in the code causing the computer system to securely authenticate an identity of a user participating in an electronic transaction. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of securely authenticating an identity of a user participating in an electronic transaction.

While it is understood that program code 314 for securely authenticating an identity of a user participating in an electronic transaction may be deployed by manually loading directly in client, server and proxy computers (not shown) via loading a computer-readable storage medium (e.g., computer data storage unit 312), program code 314 may also be automatically or semi-automatically deployed into computer 300 by sending program code 314 to a central server or a group of central servers. Program code 314 is then downloaded into client computers (e.g., computer 300) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of securely authenticating an identity of a user participating in an electronic transaction. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 304 and computer data storage unit 312) having computer readable program instructions 314 thereon for causing a processor (e.g., CPU 302) to carry out aspects of the present invention.

The computer readable storage medium (i.e., computer readable storage device) can be a tangible device that can retain and store instructions (e.g., program code 314) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 300) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIGS. 3A-3B) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 300) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 300), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In one embodiment, memory 304 is ROM and computer 300 is a special purpose computer, where the ROM includes instructions of program code 314 that are executed by CPU 302 via ROM 304 to securely authenticate an identity of a user participating in an electronic transaction.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of securely authenticating an identity of a user participating in an electronic transaction with an enterprise, the method comprising the steps of:
    a computer converting (1) a request for a biometric identifier or (2) a security question to a first complete Quick Response (QR) code, the request for the biometric identifier or the security question being selected to authenticate the identity of the user;
    based on information that specifies attributes of (1) the user and (2) a request from a mobile device of the user to initiate the electronic transaction, the computer disassembling the first complete QR code into first and second portions of the first complete QR code, the first portion of the first complete QR code selected by a QR code disassembly algorithm, and the first and second portions of the first complete QR code not having an element in common;
    the computer sending to the mobile device the first portion of the first complete QR code, but not the second portion of the first complete QR code, which prevents an entity other than the user and the enterprise from obtaining the request for the biometric identifier or the security question by intercepting or capturing network traffic that includes the electronic transaction;
    in response to a scan of the first portion of the first complete QR code by the mobile device, a reassembly of the first complete QR code by the mobile device which employs the first portion of the first complete QR code and a QR code assembly algorithm, a display by the mobile device of the request for the biometric identifier or the security question, a receipt by the mobile device of the biometric identifier or an answer to the security question, a conversion of the biometric identifier or the answer to the security question to a second complete QR code, a disassembly of the second complete QR code into first and second portions of the second complete QR code by employing the QR code disassembly algorithm, and a transmission of the first portion of the second complete QR code from the mobile device to the computer, the computer reassembling the second complete QR code by employing the QR code assembly algorithm and the first portion of the second complete QR code, which prevents the entity other than the user and the enterprise from obtaining the biometric identifier or the answer to the security question by intercepting or capturing the network traffic that includes the electronic transaction;
    the computer determining whether the biometric identifier or the answer to the security question converted to the second complete QR code matches a record in a data repository that includes biometric identifiers or answers to security questions; and
    if the biometric identifier or the answer to the security question converted to the second complete QR code matches the record in the data repository, the computer authorizing the electronic transaction or if the biometric identifier or the answer to the security question converted to the second complete QR code does not match any record in the data repository, the computer indicating the electronic transaction is not authorized.

2. The method of claim 1, wherein the reassembly of the first complete QR code by the mobile device is performed in response to:
    the mobile device generating a plurality of initial potential QR codes of a plurality of requests for biometric identifiers or a plurality of security questions;
    the mobile device deleting portions of the respective initial potential QR codes by employing the QR code disassembly algorithm and the information that specifies the attributes of the user and the request, each of the deleted portions matching a shape of the first portion of the first complete QR code;
    the mobile device generating new potential QR codes by filling in the deleted portions with the first portion of the first complete QR code;
    the mobile device determining that one of the new potential QR codes matches one of the initial potential QR codes in the plurality of initial potential QR codes; and
    based on the one new potential QR code matching one of the initial potential QR codes, the mobile device determining the one new potential QR code is the reassembly of the first complete QR code.

3. The method of claim 1, wherein the step of reassembling the second complete QR code by employing the QR code assembly algorithm and the first portion of the second complete QR code includes:
    the computer generating a plurality of initial potential QR codes of a plurality of biometric identifiers or a plurality of answers to the security questions;
    the computer deleting portions of the respective initial potential QR codes by employing the QR code disassembly algorithm and information that specifies the attributes of the user and the transmission of the first portion of the second complete QR code, each of the deleted portions matching a shape of the first portion of the second complete QR code;
    the computer generating new potential QR codes by filling in the deleted portions with the first portion of the second complete QR code;

the computer determining that one of the new potential QR codes matches one of the initial potential QR codes in the plurality of initial potential QR codes; and based on the one new potential QR code matching one of the initial potential QR codes, the mobile device determining the one new potential QR code is a reassembly of the second complete QR code.

4. The method of claim 1, further comprising the steps of:

the computer completing a handshake with the mobile device; and the computer recording a timestamp of the handshake, wherein the information that specifies the attributes of the request to initiate the electronic transaction includes the timestamp, and wherein the step of disassembling the first complete QR code into the first and second portions of the first complete QR code includes selecting the first portion of the first complete QR code based at least in part on the recorded timestamp.

5. The method of claim 1, further comprising:

prior to any transaction between the user and the enterprise, the computer storing a plurality of security questions, receiving from the user and storing a plurality of biometric identifiers of the user or a plurality of answers to the security questions, and generating and storing a plurality of requests for the biometric identifiers;

subsequent to a receipt of the request to initiate the electronic transaction, the computer determining the electronic transaction is a banking transaction for an amount of money that exceeds a threshold amount; and based on the banking transaction being for an amount of money exceeding the threshold amount, the computer utilizing a random number generator which randomly selects the request for the biometric identifier from the plurality of requests for the biometric identifiers or the security question from the plurality of security questions.

6. The method of claim 1, further comprising the step of:

providing at least one support service for at least one of creating, integrating, hosting, maintaining, and deploying computer-readable program code in the computer, the program code being executed by a processor in the computer to implement the steps of converting the request, disassembling the first complete QR code, and sending the first portion of the first complete QR code, reassembling the second complete QR code, determining whether the biometric identifier or the answer to the security question matches the record in the data repository, and authorizing the electronic transaction if the biometric identifier or the answer matches the record or indicating the electronic transaction is not authorized if the biometric identifier or the answer does not match any record in the data repository.

7. A computer program product, comprising:

a computer-readable storage medium; and a computer-readable program code stored in the computer-readable storage medium, the computer-readable program code containing instructions that are executed by a central processing unit (CPU) of a computer system to implement a method of securely authenticating an identity of a user participating in an electronic transaction with an enterprise, the method comprising the steps of:

the computer system converting (1) a request for a biometric identifier or (2) a security question to a first complete Quick Response (QR) code, the request for the biometric identifier or the security question being selected to authenticate the identity of the user;

based on information that specifies attributes of (1) the user and (2) a request from a mobile device of the user to initiate the electronic transaction, the computer system disassembling the first complete QR code into first and second portions of the first complete QR code, the first portion of the first complete QR code selected by a QR code disassembly algorithm, and the first and second portions of the first complete QR code not having an element in common;

the computer system sending to the mobile device the first portion of the first complete QR code, but not the second portion of the first complete QR code, which prevents an entity other than the user and the enterprise from obtaining the request for the biometric identifier or the security question by intercepting or capturing network traffic that includes the electronic transaction;

in response to a scan of the first portion of the first complete QR code by the mobile device, a reassembly of the first complete QR code by the mobile device which employs the first portion of the first complete QR code and a QR code assembly algorithm, a display by the mobile device of the request for the biometric identifier or the security question, a receipt by the mobile device of the biometric identifier or an answer to the security question, a conversion of the biometric identifier or the answer to the security question to a second complete QR code, a disassembly of the second complete QR code into first and second portions of the second complete QR code by employing the QR code disassembly algorithm, and a transmission of the first portion of the second complete QR code from the mobile device to the computer system, the computer system reassembling the second complete QR code by employing the QR code assembly algorithm and the first portion of the second complete QR code, which prevents the entity other than the user and the enterprise from obtaining the biometric identifier or the answer to the security question by intercepting or capturing the network traffic that includes the electronic transaction;

the computer system determining whether the biometric identifier or the answer to the security question converted to the second complete QR code matches a record in a data repository that includes biometric identifiers or answers to security questions; and if the biometric identifier or the answer to the security question converted to the second complete QR code matches the record in the data repository, the computer system authorizing the electronic transaction or if the biometric identifier or the answer to the security question converted to the second complete QR code does not match any record in the data repository, the computer system indicating the electronic transaction is not authorized.

8. The computer program product of claim 7, wherein the reassembly of the first complete QR code by the mobile device is performed in response to:

the mobile device generating a plurality of initial potential QR codes of a plurality of requests for biometric identifiers or a plurality of security questions;

the mobile device deleting portions of the respective initial potential QR codes by employing the QR code disassembly algorithm and the information that specifies the attributes of the user and the request, each of the deleted portions matching a shape of the first portion of the first complete QR code;

the mobile device generating new potential QR codes by filling in the deleted portions with the first portion of the first complete QR code;

the mobile device determining that one of the new potential QR codes matches one of the initial potential QR codes in the plurality of initial potential QR codes; and based on the one new potential QR code matching one of the initial potential QR codes, the mobile device determining the one new potential QR code is the reassembly of the first complete QR code.

9. The computer program product of claim 7, wherein the step of reassembling the second complete QR code by employing the QR code assembly algorithm and the first portion of the second complete QR code includes:

the computer system generating a plurality of initial potential QR codes of a plurality of biometric identifiers or a plurality of answers to the security questions;

the computer system deleting portions of the respective initial potential QR codes by employing the QR code disassembly algorithm and information that specifies the attributes of the user and the transmission of the first portion of the second complete QR code, each of the deleted portions matching a shape of the first portion of the second complete QR code;

the computer system generating new potential QR codes by filling in the deleted portions with the first portion of the second complete QR code;

the computer system determining that one of the new potential QR codes matches one of the initial potential QR codes in the plurality of initial potential QR codes; and based on the one new potential QR code matching one of the initial potential QR codes, the mobile device determining the one new potential QR code is a reassembly of the second complete QR code.

10. The computer program product of claim 7, wherein the method further comprises the steps of:

the computer system completing a handshake with the mobile device; and the computer system recording a timestamp of the handshake, wherein the information that specifies the attributes of the request includes the timestamp, and wherein the step of disassembling the first complete QR code into the first and second portions of the first complete QR code includes selecting the first portion of the first complete QR code based at least in part on the recorded timestamp.

11. The computer program product of claim 7, wherein the method further comprises:

prior to any transaction between the user and the enterprise, the computer system storing a plurality of security questions, receiving from the user and storing a plurality of biometric identifiers of the user or a plurality of answers to the security questions, and generating and storing a plurality of requests for the biometric identifiers;

subsequent to a receipt of the request to initiate the electronic transaction, the computer system determining the electronic transaction is a banking transaction for an amount of money that exceeds a threshold amount; and based on the banking transaction being for an amount of money exceeding the threshold amount, the computer system utilizing a random number generator which randomly selects the request for the biometric identifier from the plurality of requests for the biometric identifiers or the security question from the plurality of security questions.

12. A method of securely authenticating an identity of a user participating in an electronic transaction with an enterprise, the method comprising the steps of:

in response to a selection of a request for a biometric identifier or a security question to authenticate the identity of the user, a conversion of the selected request for the biometric identifier or the security question to a first complete Quick Response (QR) code, a disassembly of the first complete QR code into first and second portions of the first complete QR code by a QR code disassembly algorithm based on information that specifies attributes of (1) the user and (2) a request to a server computer of the enterprise to initiate the electronic transaction, the first and second portions of the first complete QR code not having an element in common, a mobile device receiving from the server computer the first portion of the first complete QR code, but not the second portion of the first complete QR code, which prevents an entity other than the user and the enterprise from obtaining the request for the biometric identifier or the security question by intercepting or capturing network traffic that includes the electronic transaction;

the mobile device scanning the first portion of the first complete QR code;

the mobile device reassembling the first complete QR code by employing a QR code assembly algorithm based on the first portion of the first complete QR code and the information that specifies the attributes of the user and the request to initiate the electronic transaction;

based on the reassembled first complete QR code, the mobile device displaying the request for the biometric identifier or the security question;

the mobile device receiving from the user the biometric identifier or an answer to the security question;

the mobile device converting the biometric identifier or the answer to the security question to a second complete QR code;

the mobile device disassembling the second complete QR code into first and second portions of the second complete QR code by employing the QR code disassembly algorithm based on the information that specifies the attributes of the user and information that specifies attributes of a request to complete an authentication of the identity of the user;

the mobile device sending the first portion of the second complete QR code to the server computer; and in response to a reassembly by the server computer of the second complete QR code by employing the QR code assembly algorithm based on the first portion of the second complete QR code, the information that specifies the attributes of the user, and the information that specifies the attributes of the request to complete the authentication, which prevents the entity other than the user and the enterprise from obtaining the biometric identifier or the answer to the security question by intercepting or capturing the network traffic that includes the electronic transaction, and a determination of whether the biometric identifier or the answer to the security question matches a record in a data repository that includes biometric identifiers or answers to security questions, the mobile device receiving an indication that the electronic transaction is authorized if the biometric identifier or the answer to the security question matches the record in the data repository or the mobile device receiving an indication that the electronic transaction is not authorized if the biometric identifier or the answer to the security question does not match any record in the data repository.

13. The method of claim 12, wherein the step of reassembling the first complete QR code is performed in response to:
- the mobile device generating a plurality of initial potential QR codes of a plurality of requests for biometric identifiers or a plurality of security questions;
- the mobile device deleting portions of the respective initial potential QR codes by employing the QR code disassembly algorithm and the information that specifies the attributes of the user and the request for the biometric identifier or the security question, each of the deleted portions matching a shape of the first portion of the first complete QR code;
- the mobile device generating new potential QR codes by filling in the deleted portions with the first portion of the first complete QR code;
- the mobile device determining that one of the new potential QR codes matches one of the initial potential QR codes in the plurality of initial potential QR codes; and
- based on the one new potential QR code matching one of the initial potential QR codes, the mobile device determining the one new potential QR code is the reassembly of the first complete QR code.

14. The method of claim 12, further comprising the steps of:
- the mobile device completing a handshake with the server computer; and
- the mobile device recording a timestamp of the handshake, wherein the information that specifies the attributes of the request to initiate the electronic transaction includes the timestamp, and wherein the step of reassembling the first complete QR code by employing the QR code assembly algorithm based on the first portion of the first complete QR code and the information that specifies the attributes of the user and the request to initiate the electronic transaction includes selecting the first portion of the first complete QR code based at least in part on the recorded timestamp.

15. The method of claim 12, further comprising the step of:
- providing at least one support service for at least one of creating, integrating, hosting, maintaining, and deploying computer-readable program code in the computer, the program code being executed by a processor in the computer to implement the steps of receiving the first portion of the first complete QR code, scanning the first portion of the first complete QR code, reassembling the first complete QR code, displaying the request for the biometric identifier or the security question, receiving the biometric identifier or the answer to the security question, converting the biometric identifier or the answer to the security question to the second complete QR code, disassembling the second complete QR code into the first and second portions of the second complete QR code, sending the first portion of the second complete QR code to the server computer, and receiving the indication that the electronic transaction is authorized if the biometric identifier or the answer to the security question matches the record in the data repository or receiving the indication that the electronic transaction is not authorized if the biometric identifier or the answer to the security question does not match any record in the data repository.

\* \* \* \* \*